A. W. BRINKERHOFF.
Corn-Planter.
No. { 1,815; 32,819. }
Patented July 16, 1861.
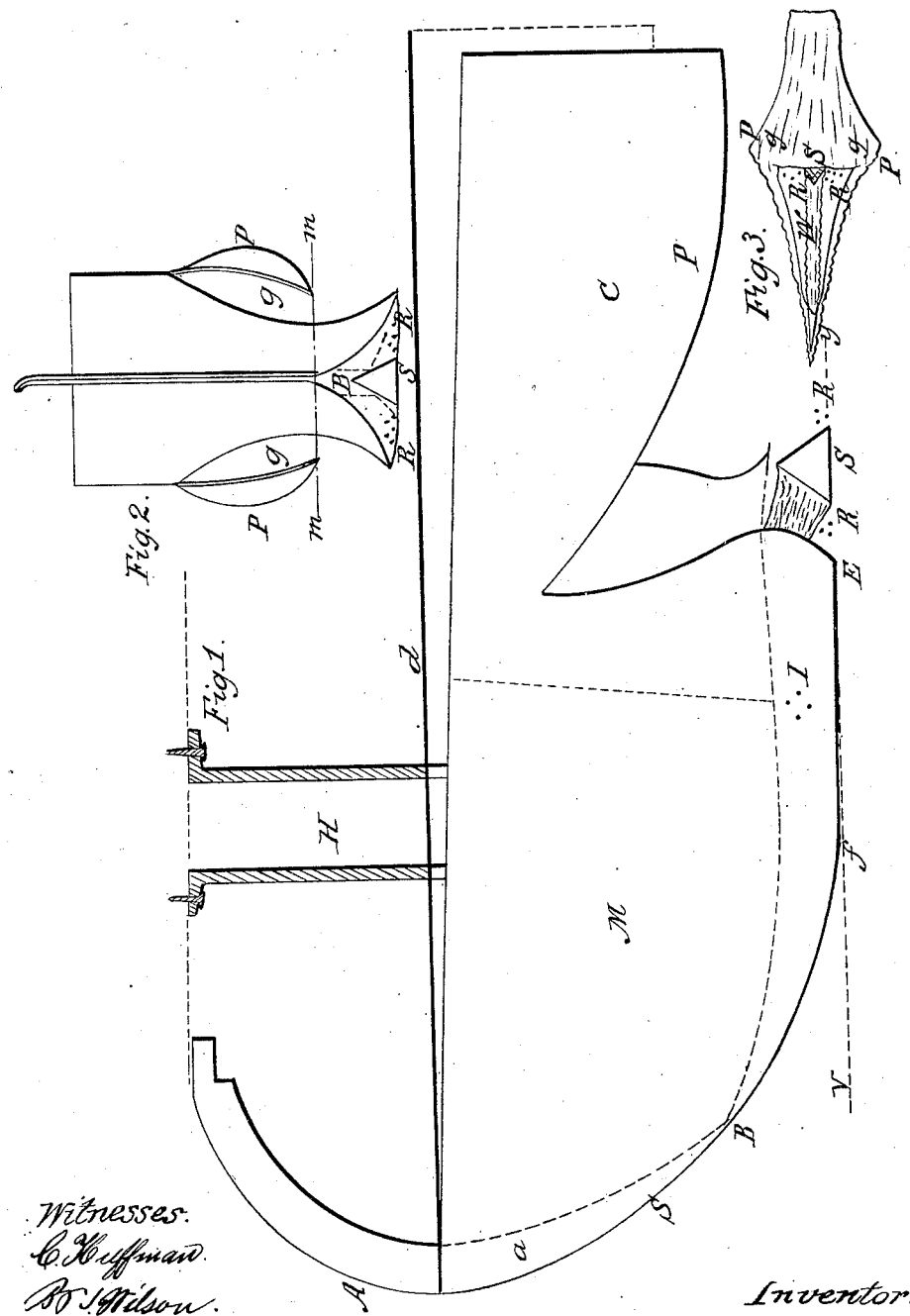
Witnesses:
C. Huffman
B. J. Wilson
Inventor.
A. W. Brinkerhoff

UNITED STATES PATENT OFFICE.

A. W. BRINKERHOFF, OF UPPER SANDUSKY, OHIO.

IMPROVEMENT IN SHOES FOR SEED-PLANTERS.

Specification forming part of Letters Patent No. 32,819, dated July 16, 1861.

*To all whom it may concern:*

Be it known that I, A. W. BRINKERHOFF, of Upper Sandusky, county of Wyandot, and State of Ohio, have invented new and useful Improvements in Shoes or Combined Openers and Coverers for Corn-Planters; and I do hereby declare that the following is a full, clear, and exact description of the construction and operation of the same, reference being had to the annexed drawings, making a part of this specification, in the several figures of which similar characters of reference denote the same part.

Figure 1 is a side view of shoe with spout H above it and scatterer S. Fig. 2 is a front view of shoe and scatterer S. Fig. 3 is a bottom view of same.

The nature of my invention consists in that particular construction of shoe or combined opener and coverer for corn-planters, whereby the forward motion of the machine does not carry forward the seed while falling from the seed boxes or cups to the earth, but allows it to fall where desired without the use of a "valve" or "second drop;" also, whereby a scatterer is formed in the furrow or gash made by the shoe; also, whereby all choking or clogging of the shoe is effectually prevented; also, whereby the corn is effectually covered without lateral compression before being acted upon by the wheels or rollers.

Having thus stated the nature of my invention, I will now proceed to explain the mode of construction and operation of the same.

This shoe is constructed by welding together two pieces of sheet-steel with upward-curved front edges, between which is also firmly welded a half-circle of iron, as seen at $a$, Fig. 1, the curved front edge of which turns rearward above the sides of the shoe, as seen at A, Fig. 1, for the purpose of attaching to bottom of frame. The sheets of steel are welded together as far down as letter B, Fig. 1, which is two inches above ground-line $y\,y$, from which point B to E they gradually diverge, being at $f$ two inches apart.

In the rear of the opener M, and combined therewith, is the coverer C, with expanding wings P, elevated above the ground-line $y\,y$ two inches, as nearly as can be, (to conform to the opening in opener,) as seen at B, Fig. 1, and at dotted line $m\,m$, Fig. 2, the front edges of which are also curved upward for the purpose of passing over rubbish, and converging rearward until they conform to the width of rear end of opener, as seen in Fig. 3.

The scatterer S, Figs. 1, 2, and 3, is formed by the openings B in Figs. 1 and 2, said openings leaving a conical-shaped ridge of earth in the center of the gash, which is done by the diverging sides of opener M leaving spaces at each side of scatterer S, as shown at R, Figs. 1, 2, and 3.

The operation of said shoe or combined opener and coverer is as follows, viz: In passing forward the sharp front edge, $s$, of opener M cuts through and divides the ground, making the gash into which the seed is dropped, as shown at W and R R, Fig. 3, and as the shoe continues to move forward the earth enters in through openings $g$, as shown in Figs. 2 and 3, and is drawn by wings P upon the deposited seed from above, thereby allowing it to remain scattered, as shown at R, Figs. 2 and 3. The open construction and diverging sides of opener M prevents the seed from being carried forward by the forward motion of the machine, and allows it, after leaving spout H, to fall freely to the ground and into the gash or furrow before any earth enters at openings $g$, Fig. 2. When the seed is dropped at $d$ by the time the spout H has moved forward to where represented in drawings, Fig. 1, the seed reaches the earth, as shown at I, thereby depositing the seed in fresh, moist earth. Runners or shoes closed in front to ground-line $y\,y$, Fig. 1, or with tubes in the rear of opener, through which the seed passes to the ground, when, after being elevated in turning around, they are lowered and pressed into the earth, are often clogged or choked by the earth passing upward into them, whereby the dropping is checked without knowledge to the operator and to the great detriment of the farmer. The construction of opener M is such that when, after elevation in turning around, the shoe is forced into the earth, whereby it may become entirely filled up, still when put in motion it is immediately cleared by the earth forcing in at opening B, Figs. 1 and 2, easily forcing rearward all adhering matter at starting through the widening passage W, Fig. 3. By said opening B, Figs. 1 and 2, I also form in the center of the gash or furrow made by opener M a continuous scatterer, S, Figs. 1, 2, and 3, of earth, by which the seed, when dropped, is effectually scattered.

Having thus fully described my invention and the operation thereof, what I claim, and desire to secure by Letters Patent, is—

The combination and arrangement of opener M and coverer P, constructed substantially as described, and for the purposes set forth.

A. W. BRINKERHOFF.

Witnesses:
W. T. WILSON,
C. HUFFMAN.